Figure 1:
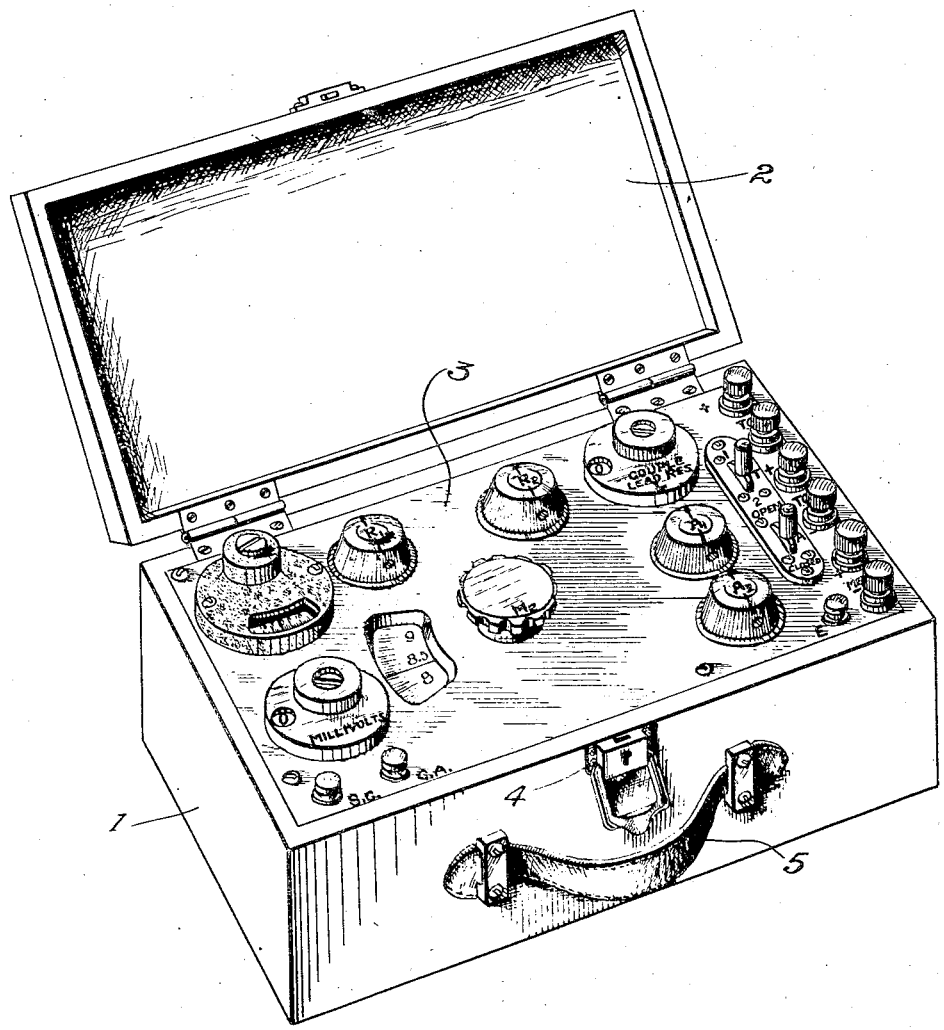

May 30, 1933.  E. J. ALBERT  1,912,242
POTENTIOMETER DEVICE FOR TESTING AND CALIBRATING METERS
Filed Nov. 26, 1929    2 Sheets-Sheet 1

Inventor:-
Edward J. Albert
by his Attorneys
Howson & Howson

May 30, 1933.  E. J. ALBERT  1,912,242
POTENTIOMETER DEVICE FOR TESTING AND CALIBRATING METERS
Filed Nov. 26, 1929   2 Sheets-Sheet 2
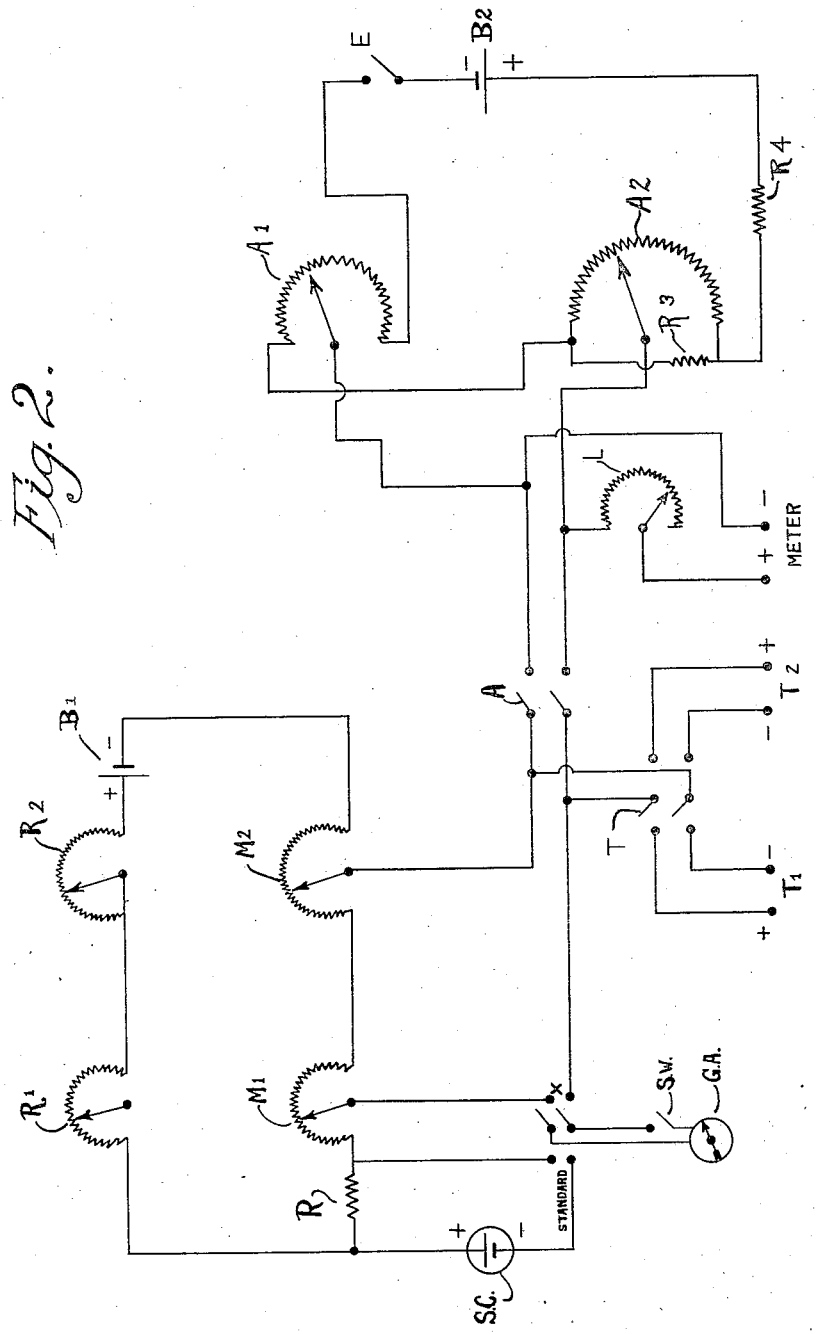
Inventor:-
Edward J. Albert.
by his Attorneys
Howson & Howson.

Patented May 30, 1933

1,912,242

UNITED STATES PATENT OFFICE

EDWARD J. ALBERT, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA

POTENTIOMETER DEVICE FOR TESTING AND CALIBRATING METERS

Application filed November 26, 1929. Serial No. 409,934.

This invention relates to electrical measuring instruments and, particularly, refers to electrical devices for comparing and calibrating pyrometers of the thermocouple type.

The principal object of the invention is to provide an instrument for testing and calibrating pyrometers, millivoltmeters and the like and for checking thermocouples of pyrometers, which is extremely sensitive and accurate and which gives readings of a higher order of precision than has heretofore been possible in instruments of this type.

A further object is to provide a sensitive instrument which may be used to check all types and makes of pyrometers with the least difficulty.

A still further object is to provide an instrument which is rugged in design, portable so that it may be easily carried from place to place without affecting its sensitivity and so that pyrometers may be checked while in service and while thermocouples are connected in the circuit.

Another object is the provision of an auxiliary electric circuit by means of which an E. M. F. may be impressed on the pyrometer under test corresponding to the temperature at which it is desired to make the test.

Other objects will appear from the description taken with the accompanying drawings, in which Fig. 1 is a perspective view of the instrument assembled in a cabinet; and Fig. 2 is a wiring diagram showing the circuits involved and connections to be made to obtain the desired results.

Referring to Fig. 1, the instrument comprises a cabinet 1 with a sliding hinge cover 2 which may be easily removed when the instrument is being used and replaced when checking or testing is completed. Mounted in the top of the cabinet is a panel 3 of suitable insulating material, such as hard rubber or some phenol condensation product. On the upper side of the panel are mounted the various controls, indicating dials and binding posts and switches and on the underside (not shown) are the electrical elements and wiring leads providing the necessary connections of the elements for the required circuits which are shown in Fig. 2. The cabinet is provided with a lock 4 and a handle 5 so that the instrument may be easily carried from place to place. The standard cell S. C. and the batteries $B_1$ and $B_2$ are enclosed in the cabinet 1.

The instrument embodies the potentiometer principle of measurement which provides the fundamental method of measuring electro-motive force by comparing the unknown E. M. F. against the E. M. F. supplied by a standard cell. A galvanometer of the suspension type is used to determine when a balance is obtained between the circuit of the standard cell and a potentiometer circuit of the instrument.

Referring to Fig. 2, SC denotes a standard cell which has in series therewith a fixed resistance R. Connected in parallel with the resistance R is a potentiometer circuit containing resistances $R_1$ $R_2$, battery $B_1$ and resistances $M_1$ and $M_2$ in series. The battery $B_1$ is connected in opposition to the standard cell so that the current through R from the cell is opposite to the current from $B_1$ through the same resistance. The resistances $R_1$ and $R_2$ are adjustable, so that the potential drop across R due to current from $B_1$ may be made equal to the potential thereacross supplied by the standard cell SC.

When the potentials are equal, there is no current flow through the galvanometer which is indicated by a zero deflection of the galvanometer GA. In shunt with resistances $M_1$ and $M_2$ are a double-pole, single-throw switch A and double-pole, double-throw switch T. The switch T is provided for connecting a standard thermocouple with the resistances $M_1$ and $M_2$ in one position of the switch and for connecting the thermocouple to be tested in another position of the switch. Switch A provides for connecting a pyrometer or other meter across a second potentiometer circuit described hereinafter. The second potentiometer circuit comprises the battery $B_2$, switch E, and resistances $A_1$ and $A_2$ which impresses any desired E. M. F. on the pyrometer or other meter to be tested. The resistance L is provided to insert in circuit with the pyrometer or other meter a resistance equal to the resistance of the leads which is given by the manufacturers of the pyrometer. The resistance is provided with a dial and has the capacity to compensate for an allowance of 9 ohms lead resistance. Resistances $A_1$ and $A_2$ are adjusted until the desired E. M. F. is produced by the potentiometer circuit. In series with resistance L and the circuit of $A_1$, $A_2$ and $B_2$ are a pair of terminals marked "Meter," to which the pyrometer or other meter to be calibrated is connected.

The switch A is left open when a thermocouple is to be tested against a standard couple, but is closed when a pyrometer or other meter is to be tested or calibrated and switch T is opened. A double-pole, double-throw switch X is also provided for connecting the galvanometer across either the standard cell or the instrument under test. A single pole switch SW is also provided in the galvanometer circuit, in checking a thermocouple by comparison with a standard thermocouple, the standard is connected to the terminals $T_1$ and the thermocouple to be tested is connected to the terminals $T_2$. Switch A is opened. Switch T is closed to connect the terminals $T_1$ in circuit with $M_1$ and $M_2$. The resistances $R_1$ and $R_2$ are then adjusted until the galvanometer shows zero deflection across the standard cell. After this adjustment is made, the galvanometer is connected in circuit with the thermocouple $T_1$ and resistances $M_1$ and $M_2$ are adjusted until the galvanometer again shows no deflection. The resistances $M_1$ and $M_2$ are provided with dials to indicate the E. M. F. required to produce the current to balance the current from the battery $B_1$. The dial of $M_2$ is marked from zero to 11 millivolts and $M_1$ has a capacity of 90 millivolts calibrated in units of 10 millivolts. This overlapping scale makes it possible to obtain combinations of E. M. F. values to cross-check accuracy at all major divisions on the scale and insures precision accuracy. This gives a total scale capacity of 101 millivolts. The scale $M_2$ is graduated in divisions of five hundredths of a millivolt and may easily be read to twenty-five thousandths of a millivolt. When the resistances $M_1$ and $M_2$ have been adjusted for zero deflection on the galvanometer with a thermocouple $T_1$ in circuit, readings are taken and the switch T is then thrown to connect the thermocouple $T_2$ into the circuit and the resistances $M_1$ and $M_2$ are again adjusted for zero deflection of the galvanometer. The dials of $M_1$ and $M_2$ then give the values in millivolts which may be compared to the readings of the standard thermocouple.

An important feature of the present device is that it enables one to compensate directly for the temperature error of the cold junction of a thermocouple. In other words, by means of the present device, the temperature error of the cold junction may be compensated for at the outset and subsequent testing of the thermocouple will enable a direct accurate reading without the necessity of calculation. It is usual among manufacturers of pyrometers to supply millivolt date sheets showing the millivoltage values for various differences of temperature between the cold and hot junctions of the thermocouple, such values being based on a certain cold junction temperature. If the cold junction of the thermocouple were always at the assumed temperature, no compensation would be necessary. Such is not the case, however, and it becomes necessary in using any testing instrument to correct for the error caused by the actual temperature of the cold junction. By means of the present device, compensation for the cold junction temperature error can be obtained quickly and directly as follows:

The actual cold junction temperature of the thermocouple being known or readily determined by means of a thermometer, the millivoltage value corresponding to the difference between the assumed temperature and the actual temperature is taken from the manufacturer's data sheets mentioned above. Let us assume that the temperature of the cold junction measured happens to be 100 degrees. By referring to the maker's millivoltage table, I find that the standard method of calibration is to use a cold junction temperature of 80 degrees. Inasmuch as the millivoltage of the thermocouple is dependent on the difference in temperature between the hot junction and the cold junction, it follows that in the case cited the millivoltage would be less than if the cold junction of the thermocouple were 80 degrees.

By reference to the manufacturer's millivolt data I find that 20 degrees is equivalent, I will say to .4 millivolt.

Switches A and E are closed and switch T is opened. Assuming that the potentiometer circuit of source $B_1$ has been calibrated against the standard cell, in a manner previously described, resistances $M_1$ and $M_2$ are set to read the millivoltage value corresponding to the cold junction temperature error, as determined from the manufacturer's data sheets, viz. .4 millivolt. Resistances $A_1$ and $A_2$ are now adjusted until the galvanometer shows zero deflection. At such time, the potential derived from resistances $M_1$ and $M_2$, viz., that corresponding to the cold junction temperature error or .4 millivolt, is balanced by the potential derived from the resistances $A_1$ and $A_2$. In other words, I have set up across resistances $A_1$ and $A_2$ a potential corresponding to the cold junction temperature error of the thermocouple or .4 millivolt.

At this time, the thermocouple, which it is desired to test, is connected in series with the source of potential derived from resistances $A_1$ and $A_2$ and in aiding relation thereto by connecting the negative side of the thermocouple to the positive "meter" terminal and the positive side of the thermocouple to the negative $T_2$ terminal. A jumper is connected between the negative "meter" terminal and the positive $T_2$ terminal. Either terminals $T_1$ or $T_2$ may be used, $T_2$ merely being chosen for the purpose of illustration. It will be noted that when thus connected, the thermocouple is connected in series aiding relation with the potential derived from resistances $A_1$ and $A_2$. Switch A is now opened and switch T is closed to the right. Resistances $M_1$ and $M_2$ are now adjusted until the galvanometer shows no deflection, at which time, the indicating scales of these resistances will indicate a potential which is the resultant of the apparent electromotive force of the thermocouple and that derived from resistances $A_1$ and $A_2$. Since the latter potential is that corresponding to the cold junction temperature error of the thermocouple, the reading on $M_1$ and $M_2$ is a true erading of the actual thermocouple electromotive force with the error compensated for.

Cold junction temperatures above and below the assumed temperature may be compensated, the only difference in either case being as to the polarity of the thermocouple with respect to the potential derived from resistances $A_1$ and $A_2$. In the example assumed where the actual cold junction temperature was above assumed temperature, the thermocouple was connected so that its potential aided that derived from resistances $A_1$ and $A_2$. If the actual cold junction temperature were below the assumed temperature, the thermocouple should be connected so that its potential would oppose that derived from resistances $A_1$ and $A_2$.

When a pyrometer or other meter is to be tested or calibrated, the pyrometer is connected to the terminals marked "Meter" and $L_1$ is adjusted to the value nearest the value of the lead resistance of the pyrometer. Switch E is then closed, thus applying a potential to the pyrometer, and $A_1$ and $A_2$ are adjusted until the pyrometer reads the temperature desired. Switch A is then closed and $M_1$ and $M_2$ are adjusted until the galvanometer shows no deflection. The temperature equivalent of the potentiometer reading may be secured by consulting the temperature millivolt data to which the pyrometer is calibrated. After the test is completed, the switch E should be opened in order to prevent the running down of the battery. The resistances $R_1$, $M_1$ and $A_1$ are provided for coarse adjustment of the respective circuits in which they are in, while resistances $R_2$, $M_2$ and $A_2$ provide for fine adjustment.

From the above description, it will be apparent that the device of my invention provides a compact instrument of varied utility combined with a high order of precision which has not been possible with devices of the prior art.

The instrument is self contained, including the necessary batteries and standard cell. Although designed primarily for checking thermocouples and thermo-electric pyrometers, it can be used with advantage for any application for which potentiometers are used, provided the electro-motive force to be measured does not exceed .11 volt.

It is obvious that other arrangements of the circuits and the elements may be made without departing from the scope of the invention and I, therefore, desire to be limited only by the scope of the appended claims. In the claims the term "potentiometer circuit" is to be construed as meaning a circuit operating according to the potentiometer principle to give various electromotive forces.

I claim:

1. A device of the class described, comprising a source of variable electromotive force having indicating means associated therewith, a second source of variable electromotive force, a line connecting said sources in opposed relation with each other, a switch in said line, a galvanometer, means for connecting said galvanometer in said line, a pair of terminal leads connectable to said line on one side of said switch, and a second pair of terminal leads connected to said line on the other side of said switch.

2. A device of the class described, comprising a potentiometer circuit having indicating means associated therewith, a second potentiometer circuit, a line connecting said circuits in opposed relation with each other, a switch in said line, a galvanometer, means for connecting said galvanometer in said line, a pair of terminal leads connectable to said line on one side of said switch, and a second pair of terminal leads connected to said line on the other side of said switch.

EDWARD J. ALBERT.